UNITED STATES PATENT OFFICE.

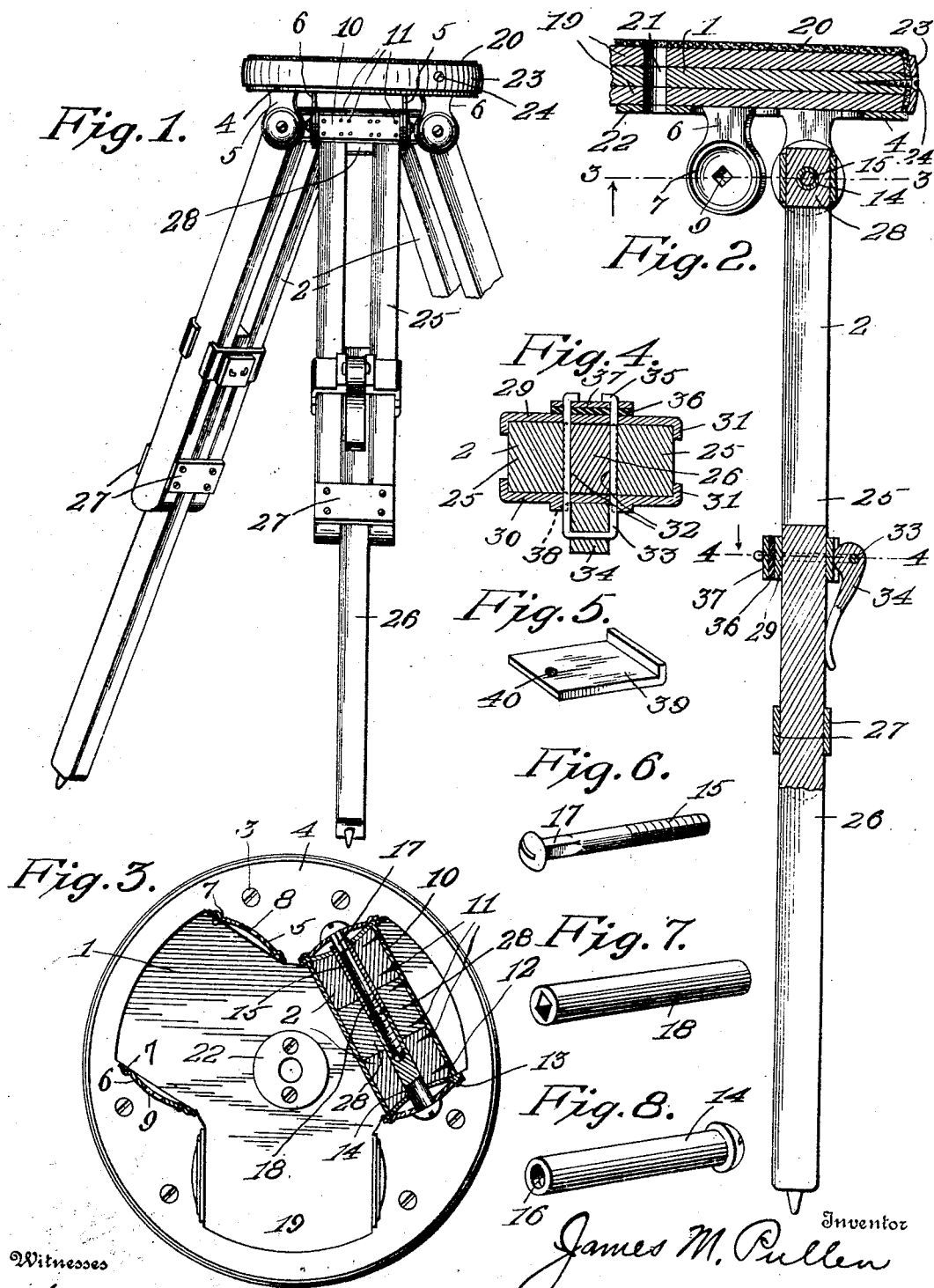

JAMES M. PULLEN, OF OZARK, MISSOURI.

TRIPOD.

939,859.

Specification of Letters Patent.   Patented Nov. 9, 1909.

Application filed February 15, 1909.   Serial No. 477,855.

*To all whom it may concern:*

Be it known that I, JAMES M. PULLEN, a citizen of the United States, residing at Ozark, in the county of Christian and State of Missouri, have invented certain new and useful Improvements in Tripods, of which the following is a specification, reference being had to the accompanying drawings.

This invention relates to improvements in tripods for cameras, scientific instruments and the like.

The objects of the invention are to provide an improved pivotal connection between the head and legs of the tripod, an improved clamp for the sliding sections of its adjustable legs, and an improved construction of tripod head, whereby a tripod is produced that is simple in construction and cheap to manufacture, strong and durable in use and easy to adjust, and which insures absolute rigidity, automatic tension and take up for wear at the joints.

With the above and other objects in view, the invention consists of the novel features of construction and the combination and arrangement of parts hereinafter fully described and claimed, and illustrated in the accompanying drawings, in which—

Figure 1 is a side elevation of my improved tripod; Fig. 2 is a detail vertical section; Fig. 3 is a detail horizontal section looking toward the bottom of the tripod head, the plane of the section being indicated by the line 3—3 in Fig. 2; Fig. 4 is a detail section taken on the plane indicated by the line 4—4 in Fig. 2; Fig. 5 is a detail perspective of a wear plate that may be used in connection with the leg clamp; and Figs. 6, 7 and 8 are perspective views of the several parts of one of the pivots for the legs.

In the drawings 1 denotes a tripod head and 2 its legs which are united to the head by my improved pivotal connections or joints which provide an automatic tension and insure absolute rigidity. Secured to the bottom of the head 1, by screws or other fastenings 3, is a metal plate or disk 4 from which are stamped and bent pairs of depending bearing ears 5, 6. The opposing ears of each pair have concaved opposing faces surrounded by concentric bearing grooves or channels 7 stamped into said ears, as more clearly shown in Figs. 2 and 3 of the drawings.

In each of the ears 5 is a central circular pivot opening 8 and in each of the ears 6 is a square or other flat walled pivot opening 9. Each of the tripod legs 2 has its upper end surrounded by a metal reinforcing band or casing 10 of substantially rectangular shape, the flat side portions of which are secured by screws 11 to the leg and the ends of which are concaved, as shown at 12, and formed with annular bearing ribs 13 adapted to enter the grooves 7 in the bearing ears 5, 6. The ribs 13 are concentric with the central openings formed in the concaved ends 12 of the casing 10 and are adapted to receive pivots which may be in the form of rivets, bolts or the like. However, I preferably employ an adjustable pivot such as shown in Fig. 3 and which consists of two sections 14, 15, the former of which has a threaded socket 16 to receive the threaded inner end of the latter. These sections have heads at their outer ends and the section 15 has a square or flat faced portion 17 adjacent to its head to enter the square opening 9 in one of the bearing ears 6, whereby said section of the pivot will be prevented from rotating. The other section 14 is cylindrical and rotates in the opening 8 in the bearing ear 5 so that said two-part pivot or bolt may be adjusted to vary the tension of the joint or hinge connection and thereby put the legs of the tripod under proper tension. If desired, a spacing sleeve 18 may be used on the section 15 of the pivot. From the foregoing, it will be seen that this pivotal or hinge connection provides an exceedingly rigid joint, the tension of which may be varied as desired and which may be readily adjusted to take up wear.

The head 1 of the tripod is preferably made of wood and of a plurality of superposed sections 19 arranged with the grain intersecting so that the head will not warp or be affected by dampness. These sections 19 are glued together and also united by the attaching screws 3 of the metal plate 4, which latter serves to strengthen and reinforce the head. Arranged over the top of the head is a covering 20 of felt, leather, or other yieldable or cushioning material which will protect the camera from being scratched and also relieve strain on the camera and head when the former is being secured to the latter by the usual clamping screw. This clamping screw passes through a central opening 21, the bottom of which is surrounded by the usual wear plate 22, as shown in Figs. 1 and 3 of the drawings. The covering 20 has its edge notched and extending over the edge of the tripod head and secured thereto by an annular band or ring 23. The latter is curved transversely in cross section to correspond with the curved or rounded edge of the head 1, whereby the parts will be held together by frictional engagement but, if desired, I may employ one or more transverse fastening screws 24 to more securely fasten or retain the ring 23 upon the head. By fastening the covering 20 in this manner, its edges will be prevented from curling up and working loose and the band 23, which is co-extensive in width or thickness with the head, will effectively protect the edges of the latter and prevent them from being split or broken.

Each of the tripod legs 2 is preferably made in two sections 25, 26, the upper one of which is composed of spaced bars or members between which the lower section or bar 26 is adapted to slide to vary the length of the leg. Said bars 25 of the upper section are united and spaced apart at their lower ends by metal cross plates 27, as clearly shown in Fig. 1 and their upper ends are spaced apart by a block 28 which, together with said ends, is surrounded by the casing or band 10 and secured therein by the screws 11. The two sections of the tripod leg are adapted to be retained in adjusted position by an improved clamp consisting of two plates 29, 30 arranged on the inner and outer faces of said sections and carried by the section 26 so as to slide longitudinally on the bars of the section 25. These plates are of rectangular form and, if desired, their ends may be bent angularly, as shown at 31, to extend over and engage the side edges of the bars of the section 25. Extending through alining openings in the clamping plates 29, 30 and through transverse grooves 32 formed in the sides of the section 26 adjacent its upper end, are the arms of a U-shaped member 33 carrying a cam or eccentric clamping lever 34 upon its closed or cross portion. Said clamping lever 34 is adapted to engage the outer face of the outer clamping plate 30 and the inner ends of the arms 32 of the U-shaped member 33 may be secured in or to the inner clamping plate 29 in any suitable manner. As illustrated, the inner extremities of said arms are bent inwardly, as shown at 35, and they also project through a resilient or spring cushioning element 36 and a protecting plate 37. The cushion 36 is preferably in the form of a strip of elastic rubber, but it may be a spring device of any other form that will give a trifle when pressure is applied to the clamping plates by means of the lever 34. The portion of the outer clamping plate 30 beneath the cam lever 34 is preferably recessed or channeled, as shown at 38, so that when said portion of the plate 30 wears, a small metal plate 39 may be inserted in said recess beneath the cam lever and secured by a screw passed through an opening 40 in the plate 39, as will be readily understood upon reference to Figs. 4 and 5 of the drawings.

From the foregoing it will be seen that the invention provides an exceedingly simple and practical tripod for cameras, scientific instruments and the like, and one which may be produced at a small cost, which will be absolutely rigid and strong and durable and which may be quickly and conveniently adjusted.

The peculiar construction of the several clamping devices causes them to remain rigid in adjusted position even when certain parts are slightly worn and it also permits them to be readjusted or reset to take up wear when the latter is excessive. The device is therefore exceedingly strong and durable and contains no parts that will work loose and become lost while the device is being carried from place to place. The clamping devices are also such that they will not allow the parts to work loose but will hold them rigidly without direct strain on any of the parts.

Having thus described the invention what is claimed is:

1. In a tripod, the combination of a head, a pair of bearing ears depending therefrom and having their opposing faces concaved and formed with annular bearing grooves, a leg arranged between the ears and having at the sides of its upper end circular bearing ribs to enter the grooves in said ears, and a transverse pivot passed through said leg and ears.

2. In a tripod, the combination of a head, a plate secured upon the bottom of the latter and formed with integral bearing ears struck downwardly from said plate, said ears being arranged in pairs, the opposing faces of the ears of each pair being concaved and formed with concentric bearing grooves, legs, bands surrounding the upper ends of said legs and having their ends concaved and formed with annular concentric bearing ribs to enter the grooves in said ears and adjustable pivots passed through said legs and ears and consisting of sections having screw threaded engagement with each other.

3. In a tripod, the combination of a head, a leg, the latter consisting of two sections, one having spaced bars to receive the other, clamping plates disposed on opposite sides of said sections, a U-shaped member carried by the inner or lower section and arranged in said clamping plates, a cam lever upon said U-shaped member and a cushioning device arranged upon said U-shaped member.

4. In a tripod, the combination of a head, a leg, the latter consisting of two sections, one having spaced bars to receive the other, clamping plates disposed on opposite sides of said sections, a U-shaped member carried by the inner or lower section and arranged in said clamping plates and a cam lever upon said U-shaped member, the portion of the clamping plate beneath said lever being channeled to receive a wear plate.

In testimony whereof I hereunto affix my signature in the presence of two witnesses.

JAMES M. PULLEN.

Witnesses:
R. NEIL GRAY,
JOHN S. TAYLOR.